US012716242B2

(12) United States Patent
Reeve

(10) Patent No.: US 12,716,242 B2
(45) Date of Patent: Aug. 25, 2026

(54) BUILDING LOUVRE ASSEMBLY

(71) Applicant: Trevor McGrath, Altrincham (GB)

(72) Inventor: Daniel Reeve, Stockport (GB)

(73) Assignee: Trevor McGrath, Altrincham (GB)

( * ) Notice: Subject to any disclaimer, the term of this patent is extended or adjusted under 35 U.S.C. 154(b) by 164 days.

(21) Appl. No.: 18/651,862

(22) Filed: May 1, 2024

(65) Prior Publication Data

US 2024/0368892 A1 Nov. 7, 2024

(30) Foreign Application Priority Data

May 3, 2023 (GB) ..................................... 2306545

(51) Int. Cl.
*E04F 10/08* (2006.01)
*E04F 10/00* (2006.01)
*E04F 10/10* (2006.01)
*E06B 9/28* (2006.01)

(52) U.S. Cl.
CPC .............. *E04F 10/08* (2013.01); *E04F 10/00* (2013.01); *E04F 10/10* (2013.01); *E06B 9/28* (2013.01)

(58) Field of Classification Search
CPC E04F 10/00; E04F 10/08; E04F 10/10; E06B 9/28; E06B 7/082; E06B 9/42
See application file for complete search history.

(56) References Cited

U.S. PATENT DOCUMENTS 9,719,292 B1 * 8/2017 James ................... E06B 9/0692
2014/0175240 A1 * 6/2014 Selzer ..................... E04B 7/163 49/82.1

FOREIGN PATENT DOCUMENTS

| | | | | | |
|---|---|---|---|---|---|
| CZ | 2013135 | A3 | | 9/2014 | |
| DE | 3636135 | A1 | * | 5/1987 | F24F 13/08 |
| DE | 20023113 | U1 | * | 3/2003 | E06B 7/082 |
| DE | 102006005235 | B4 | * | 5/2009 | E06B 7/084 |
| EP | 1130210 | A2 | * | 9/2001 | E06B 7/082 |
| EP | 1471207 | A1 | | 10/2004 | |
| EP | 1516998 | A1 | | 3/2005 | |
| EP | 1308597 | A1 | | 12/2006 | |
| GB | 2126708 | A | * | 3/1984 | E04F 10/08 |
| JP | 2000145078 | A | | 5/2000 | |

OTHER PUBLICATIONS

United Kingdom Intellectual Property Office, Search Report issued in priority application GB2306545.1, mailed Nov. 1, 2023.
European Patent Office, Search Report issued in counterpart application EP24173947.3, mailed Oct. 15, 2024.

* cited by examiner

*Primary Examiner* — Beth A Aubrey
(74) *Attorney, Agent, or Firm* — Kim IP Law Group LLC

(57) ABSTRACT

A building louvre assembly 10 comprising: a louvre 14 having an elongate louvre body 18 and an elongate mounting element 20, a longitudinal extent of the elongate mounting element 20 at least in part extending alongside at least a portion of a longitudinal extent of the louvre body 18, the elongate mounting element 20 including teeth 24; and a clamp 16 for being supported by a building wall or building façade, the clamp 16 having a receiver 28 for clamping on at least a portion of the elongate mounting element 20, the receiver 28 having teeth 24 configured to mesh with the teeth 24 of the elongate mounting element 20 so that the louvre 14 can be mounted at angular increments relative to the clamp 16.

16 Claims, 4 Drawing Sheets

BUILDING LOUVRE ASSEMBLY

BACKGROUND

The present invention relates to a building louvre assembly. The invention further relates to a method of setting an angle of a louvre relative to a building wall, a building wall assembly, a building wall or building façade, a louvre, and a clamp.

Louvres are used on the exterior of building walls or building façades to provide shading from the sun. Such louvres may be known as solar shading louvres. This particularly applies to high-rise buildings.

The louvres may be positioned at a particular angle relative to the building wall or façade, for example to optimise the amount of direct or indirect light transmitting to a window of the building.

The angle may be finely chosen, and so it may be important to ensure the louvre is accurately installed at said angle.

Additionally, there are typically multiple louvres mounted to a building wall or building façade, and at least some of the louvres may be required to be mounted at the same angle relative to the building wall or façade. It may be desirable to ensure that all such louvres have a closely matching angle, for aesthetic purposes.

It can be difficult and time-consuming for installers to ensure an accurate angle of the louvre during installation.

For aesthetic purposes, it is additionally desirable to conceal fixings or mounting means, also referred to as a mount, of the louvres.

The present invention seeks to provide a solution to these problems.

BRIEF SUMMARY

According to a first aspect of the present invention, there is provided a building louvre assembly comprising: a louvre having an elongate louvre body and an elongate mounting element, a longitudinal extent of the elongate mounting element at least in part extending alongside at least a portion of a longitudinal extent of the louvre body, the elongate mounting element including teeth; and a clamp for being supported by a building wall or building façade, the clamp having a receiver for supporting the louvre by clamping on at least a portion of the elongate mounting element, the receiver having teeth configured to mesh with the teeth of the elongate mounting element so that the louvre can be supported at angular increments relative to the clamp.

The meshing teeth allow for the louvre to be secured to the clamp only at a certain number of predefined relative angular positions. As such, installation of louvres at a variety of particular angles can be done accurately and repeatably. Since the elongate mounting element extends alongside the louvre, for example extending alongside a rear of the louvre, such mounting can occur at various positions of the louvre. This provides greater freedom during installation to provide more or fewer supports to the louvre as required, and to allow for variation in the positioning of building supports, such as mullions or transoms.

Preferably, the assembly may further comprise at least one cover which is a separate part to the louvre, the cover for concealing at least part of the elongate mounting element and/or the clamp. This allows for the fixings of the louvre to be hidden, and therefore to provide a cleaner and more aesthetically appealing appearance.

Beneficially, there may be at least two separate covers. As such, a cover can be positioned either side of the clamp, and so obscure the clamp from view.

Advantageously, the or each cover may be attachable to the louvre.

In a preferable embodiment the or each cover may be attachable to the louvre via an interference fit. As such, fasteners are not required to attach the cover to the louvre. This thus can permit easier and quicker installation, as well as avoiding the use of visible fasteners with the cover which may not be aesthetically appealing. However, it will be appreciated that other attachment means may be considered, such as the use of fasteners, if required.

Preferably, the interference fit may comprise at least one of the cover and the louvre having a barb.

Advantageously, the cover may have spaced apart cover portions, each cover portion having a barb configured to be secured by a corresponding lip of the louvre body. The cover therefore attaches at two sides of the louvres, preferably an upper and a lower side. This can create a strong attachment.

Beneficially, the clamp may have a plurality of parts, the parts being securable relative to each other to provide the clamping on at least the portion of the elongate mounting element.

In a preferable embodiment, the parts of the clamp may be securable by a fastener.

Optionally, the receiver of the clamp may have three open sides. In particular, the clamp is open at the front and at two sides. This allows for the clamp to be positioned at various locations along the elongate mounting element, since the elongate mounting element can be received via the front and extend through the receiver via each side. The receiver here has a semi-circular or C-shaped cross-section Preferably, the elongate mounting element has a circular cross-sectional profile or a substantially circular cross-sectional profile. This provides rotational symmetry, so that the elongate mounting element can be secured in the clamp at a variety of angular positions.

Additionally, the teeth may extend around an entirety or substantially an entirety of a perimeter of a cross section of the elongate mounting element. This maximises the number of angular positions the elongate mounting element can adopt in the receiver.

Advantageously, the longitudinal extent of the elongate mounting element may extend alongside at least a majority of the longitudinal extent of the louvre body. As such, the louvre can be mounted along at least a majority of its length.

Beneficially, the longitudinal extent of the elongate mounting element may extend alongside all or substantially all of the longitudinal extent of the louvre body. As such, the louvre can be mounted along all or nearly all of its length.

In a preferable embodiment, the teeth of the mounting element may extend along all or substantially all of the longitudinal extent of the mounting element. As such, the louvre can be mounted along all or nearly all of the length of the mounting element.

Optionally, the assembly further comprises a fastener for fastening the clamp to the building wall or building façade.

According to a second aspect of the invention, there is provided a method of setting an angle of a louvre relative to a building wall or building façade, the method comprising: a) providing the building louvre assembly according to a first aspect of the invention b) supporting the clamp from the building wall or building façade; c) positioning the mounting element in the receiver so that the teeth of the building element and the teeth of the receiver mesh and the louvre is at a pre-determined angle relative to the clamp; and d) clamping the receiver on the mounting element so as to secure the louvre in position.

According to a third aspect of the invention, there is provided a building wall assembly or building façade assembly comprising the building louvre assembly according to a first aspect of the invention and a mullion or transom, the clamp supportable by the mullion or transom.

According to a fourth aspect of the invention, there is provided a building wall or building façade comprising the building wall assembly according to a fourth aspect of the invention.

According to a fifth aspect of the invention, there is provided a louvre for the building louvre assembly according to a first aspect of the invention, the louvre comprising an elongate louvre body and an elongate mounting element, a longitudinal extent of the elongate mounting element at least in part extending alongside at least a portion of a longitudinal extent of the louvre body, the elongate mounting element including teeth, the louvre for being mounted at angular increments relative to a clamp having a receiver for clamping on at least a portion of the elongate mounting element, the receiver having teeth configured to mesh with the teeth of the elongate mounting element.

According to a sixth aspect of the invention, there is provided a clamp for the building louvre assembly according to a first aspect of the invention, the clamp for being supported by a building wall or building façade, the clamp comprising a receiver for clamping on at least a portion of an elongate mounting element of an elongate louvre body of a louvre, the elongate mounting element including teeth, the receiver having teeth configured to mesh with the teeth of the elongate mounting element so that the louvre can be mounted at angular increments relative to the clamp.

BRIEF DESCRIPTION OF THE DRAWINGS

The invention will now be more particularly described, by way of example only, with reference to the accompanying drawings, in which.

The figures each show a short lateral portion of the wider assembly.

DETAILED DESCRIPTION

Figure 1:
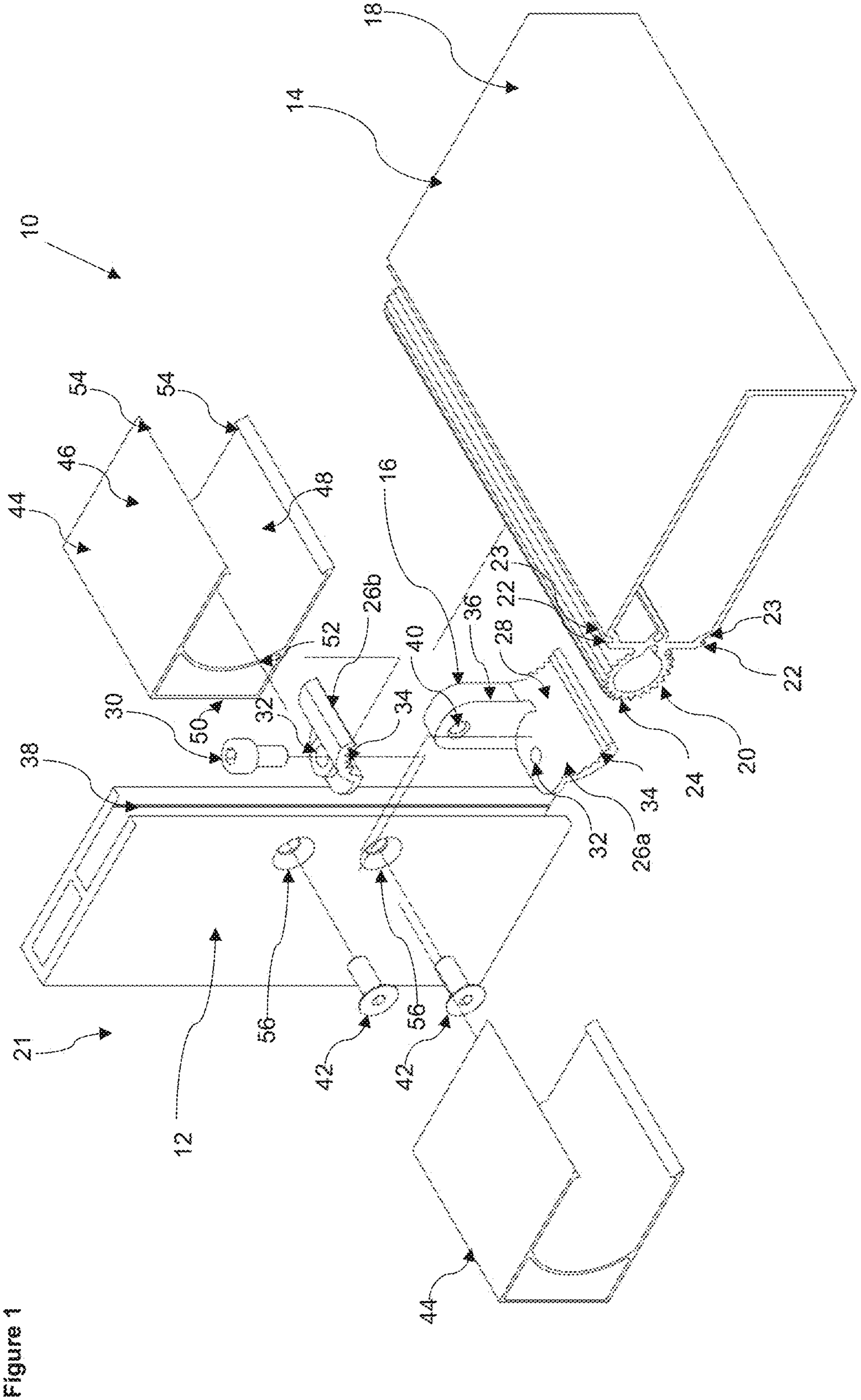
FIG. 1 shows an exploded view of a building wall assembly in accordance with a third aspect of the invention, having a building louvre assembly in accordance with a first aspect of the invention, having a louvre in accordance with a fifth aspect of the invention, and a clamp in accordance with a sixth aspect of the invention.

Referring firstly to FIG. 1, there is shown an exploded view of a building louvre assembly 10 attached to a mullion 12 or other component of a building wall to form a building wall assembly. The building louvre assembly 10 comprises a louvre 14 and a clamp 16.

The louvre 14 has an elongate louvre body 18 and an elongate mounting element 20.

The elongate louvre body 18 is hollow or substantially hollow and has a rectangular or substantially rectangular cross-section. The louvre body 18 may therefore be considered to have an elongated box-section. The louvre body 18 may comprise aluminium, and may be formed via extrusion, for example. The louvre 14 preferably has a generally uniform cross-section. It will be appreciated that the general form, shape, material, and method of manufacture of the elongate louvre body 18 may not be critical to the invention.

The louvre body 18 here extends longitudinally in a horizontal or substantially horizontal direction relative to the building.

The louvre body 18 has a proximal side, which in use is positioned proximal to the building wall 21, and a distal side, which in use is positioned distal to the building wall 21. At the proximal side there is preferably part of an interference fit. Here the said part of the interference fit includes a lip 22. There is preferably an upper lip 22 at or adjacent to an upper edge of the proximal side, and a lower lip 22 at or adjacent to a lower edge of the proximal side. Away from a direction of the wall 21 from the lip 22 there may be a groove 23. The lip 22 preferably has a pointed end for providing improved engagement.

The elongate mounting element 20 at least in part extends alongside at least a portion of a longitudinal extent of the louvre body 18. In other words, a longitudinal extent of the elongate mounting element 20 is aligned or substantially aligned with a longitudinal extent of the louvre body 18. The elongate mounting element 20 may otherwise be termed a mounting bar. Here the elongate mounting element 20 extends the entire way along the longitudinal extent of the louvre body 18.

The elongate mounting element 20 is at or adjacent to the proximal side of the elongate louvre body 18.

The elongate mounting element 20 includes teeth 24. The teeth 24 are preferably elongate, having a longitudinally extent which extends along the longitudinal extent of the mounting element 20. Preferably the teeth 24 extend continuously along the entire length of the mounting element 20. The teeth 24 are here triangular in shape, a point of the teeth 24 extending laterally or radially from the elongate mounting element 20, although it will be appreciated that other shapes may be considered.

The elongate mounting element 20 has a generally circular cross-section. As such, the mounting element 20 has rotational symmetry. The teeth 24 preferably extend around at least a majority of the cross-sectional perimeter of the elongate mounting element 20. In other words, the teeth 24 extend around at least a majority of the circumference of the elongate mounting element 20. Here the teeth 24 extend around substantially the entirety of the cross-sectional perimeter of the elongate mounting element 20, with only a small extent without teeth to permit interconnection with the louvre body 18.

The elongate mounting element 20 may be unitarily formed as a one-piece with the louvre body 18, for example being co-extruded therewith.

The clamp 16 preferably has a plurality of parts. The parts are securable relative to each other to provide the clamping on at least the portion of the elongate mounting element 20. Here there are two clamp parts 26*a*, 26*b* or two main clamp parts.

The clamp parts 26*a*, 26*b* define a receiver 28 or a mouth of the clamp 16, an upper part 26*a* forming an upper portion of the receiver 28, and a lower part 26*b* forming a lower portion of the receiver 28. A portion of the elongate mounting element 20 is receivable between the upper and lower parts 26*a*, 26*b*. The upper and lower parts 26*a*, 26*b* are configured to engage the same longitudinal portion of the elongate mounting element 20.

The upper and lower parts 26*a*, 26*b* are securable together to create a clamping action between the portions of the receiver 28. Here the upper and lower parts 26*a*, 26*b* are securable by fastener 30. As such, the parts each have a fastening surface with a fastener receiving aperture 32 therethrough. The fastening surfaces may be flat or substantially flat and extend laterally from the receiver portions, towards the building wall 21.

The receiver 28 of the clamp 16 generally has a semi-circular or C-shaped cross-section, being open at a distal side relative to the wall. The receiver 28 of the clamp 16 is also open at each axial end. As such, the receiver 28 of the clamp 16 is open in three directions.

The receiver 28 of the clamp 16 has teeth 34. The teeth 34 of the clamp 16 correspond in shape and size to the teeth 24 of the mounting element 20. As such, the teeth 34 of the clamp 16 can mesh with the teeth 24 of the mounting element 20. This is the case with the louvre 14 at various angular orientations relative to the clamp 16. As such, different teeth 24 of the mounting element 20 would mesh with different teeth 34 of the clamp 16, depending on the relative angular orientation of the two components.

The clamp 16 has a fastener or means for securing to the building wall 21 or building façade. Here the clamp 16 has a fastener or means for securing to the mullion 12 or transom of the wall or façade, or some other receiver 28 connected thereto. The clamp 16 is fastenable to the building wall 21 or building façade. The clamp 16 preferably has a protruding portion 36 which is receivable in a groove 38 of the mullion 12. The protruding portion 36 has at least one, and here two, fastener receiving apertures 40, although only one is visible in FIG. 1, for receiving a fastener 42 therethrough to secure the clamp 16 in position relative to the building wall 21. The protruding portion 36 is preferably offset in a proximal direction to the building wall 21 compared to the receiver 28, so that the receiver 28 can be proud of the groove 38 whilst the protruding portion 36 is in the groove 38.

Preferably the protruding portion 36 is on one part of the clamp 16, and here is on the lower part 26*b* of the clamp 16.

There is additionally at least one cover 44 which is a separate part to the louvre 14, the cover 44 for concealing at least part of the elongate mounting element 20 and/or the clamp 16. Here there are two covers 44 for positioning either side of the clamp 16.

Each cover 44 has an upper surface 46, a lower surface 48, and a joining surface 50 at or adjacent to a building-proximal end of the upper and lower surfaces 46, 48. The cover 44 also preferably has a supporting rib 52 which extends between the upper and lower surfaces and is preferably curved. The cover 44 is open between the upper and lower surfaces 46, 48 at a building-distal end, and additionally at side portions. This forms a receiver for receiving at least part of the louvre 14.

The covers 44 are attachable to the louvre 14, preferably by the interference fit previously mentioned to in the description of the louvre 14. As such, the covers 44 may clip 22 onto the louvre 14. Each cover 44 has another part of the interference fit for engaging with the part of the interference fit of the louvre 14. Here each upper and lower surface 46, 48 of each cover 44 terminates in a barb 54. The barb 54 has a sloping surface for passing over the lip 22 of the louvre 14, and a rearward flat surface for engaging against the lip 22 once the sloping surface has passed across. At least part of the barb 54 may be received in the groove 23

The covers 44 together extend longitudinally to a similar or identical length as the mounting element 20 to provide cover 44 across the entire mounting element 20.

Figure 2:
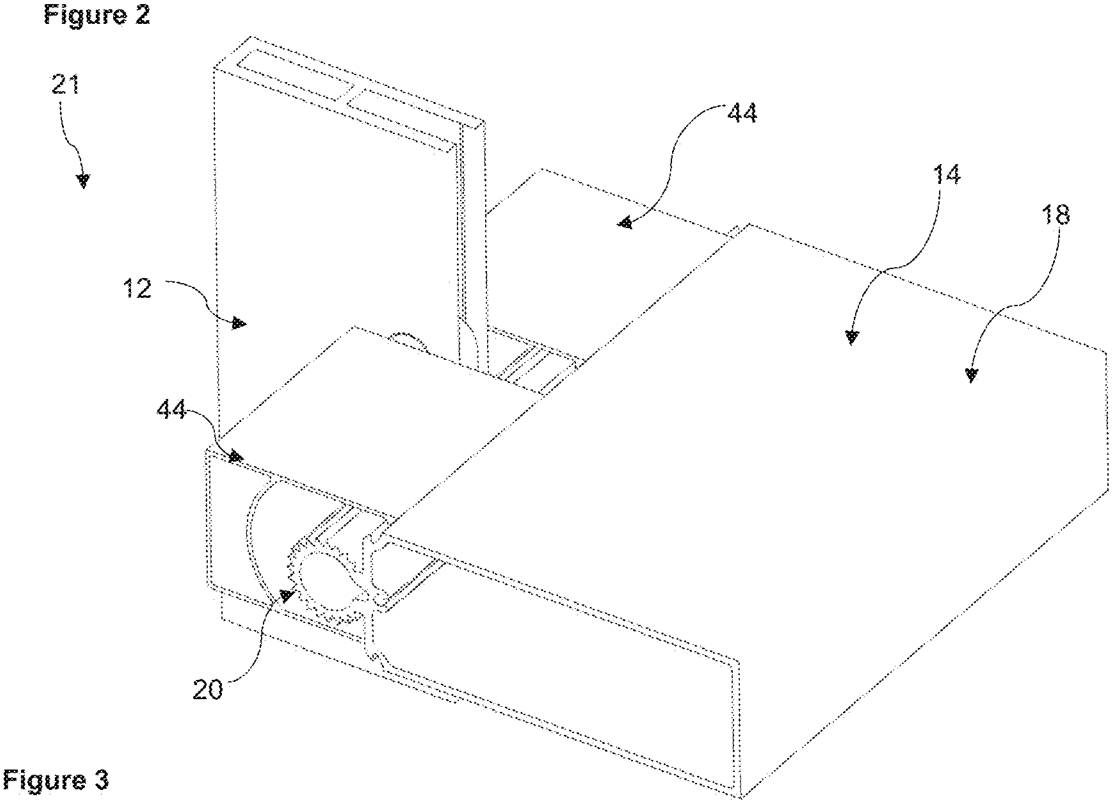
FIG. 2 shows a perspective view of the building wall assembly of FIG. 1 installed in a first condition.
Figure 3:
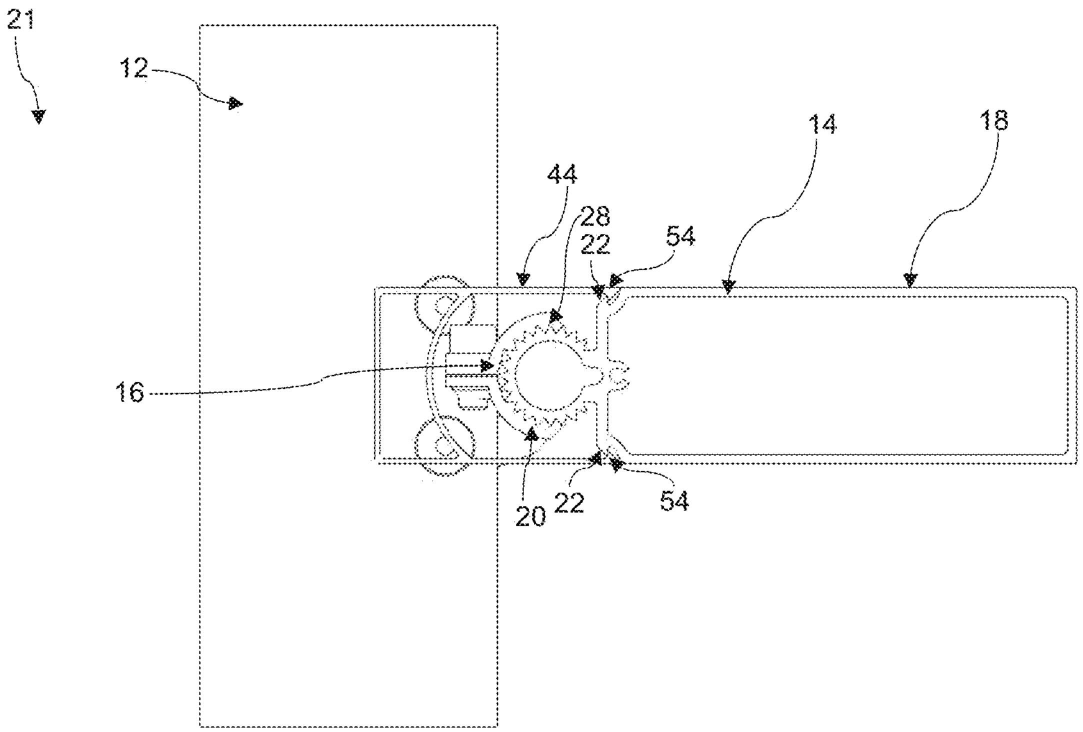
FIG. 3 shows a side view of the building wall assembly of FIG. 2.
Figure 4:
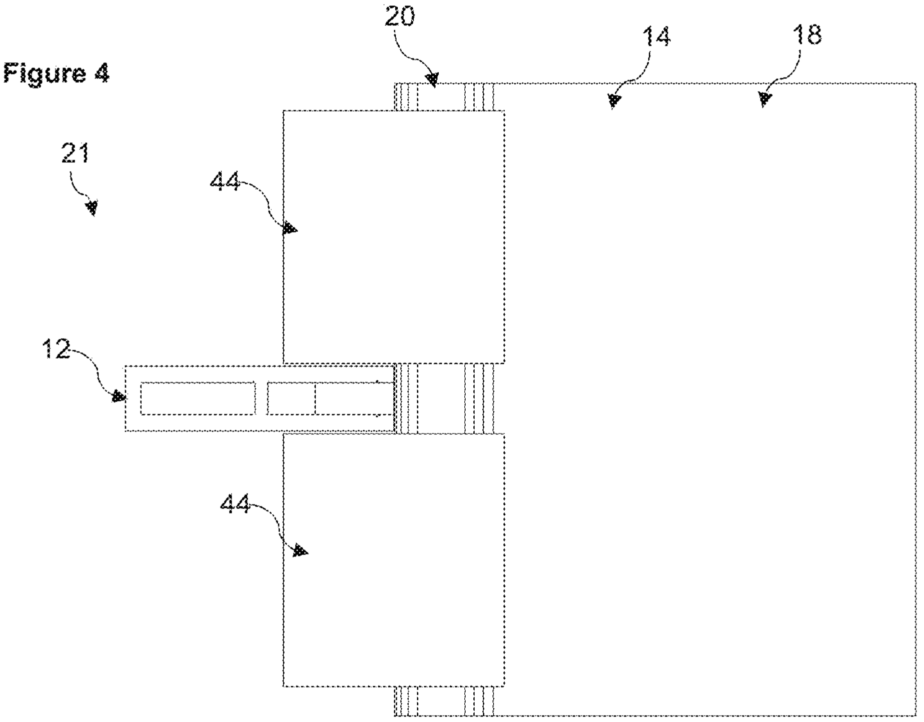
FIG. 4 shows a top view of the building wall assembly of FIG. 2.

Referring to FIGS. 2 to 4, the building louvre assembly 10 is shown attached to the mullion 12 in a first condition. The first condition is where the louvre 14 extends perpendicularly to the mullion 12, and so is in a horizontal or substantially horizontal condition.

To achieve this, the lower part 26*b* of the clamp 16 is fastened to the mullion 12 by its protruding portion 36 being inserted into the groove 38 and fasteners 42 inserted through fastener receiving apertures 56 of the mullion 12 and through the fastener receiving apertures 40 of the protruding portion 36.

Next, the mounting element 20 is inserted into the lower part 26*b* of the receiver 28 so that the louvre 14 is at the desired angle relative to the building wall 21. The upper part 26*a* of the clamp 16 is positioned on top of the mounting element 20 and the lower part 26*b* of the clamp 16. The teeth 34 of the receiver 28 mesh with the teeth 24 of the mounting element 20. Since the teeth 24, 34 can only mesh at angular increments, the louvre 14 is accurately positioned with regards to its angle. The fastener 30 of the clamp 16 is then tightened to clamp 16 or fix the mounting element 20 in place.

The covers 44 are then clipped into place over the mounting element 20 and either side of the clamp 16.

It will be appreciated that each louvre 14 may be held in place by a plurality of clamps 16 spaced apart from each in a longitudinal direction of the mounting element 20. Clamps 16 can be positioned anywhere along the mounting element 20, since the mounting element 20 extends longitudinally and the receiver 28 has three open sides.

Figure 5:
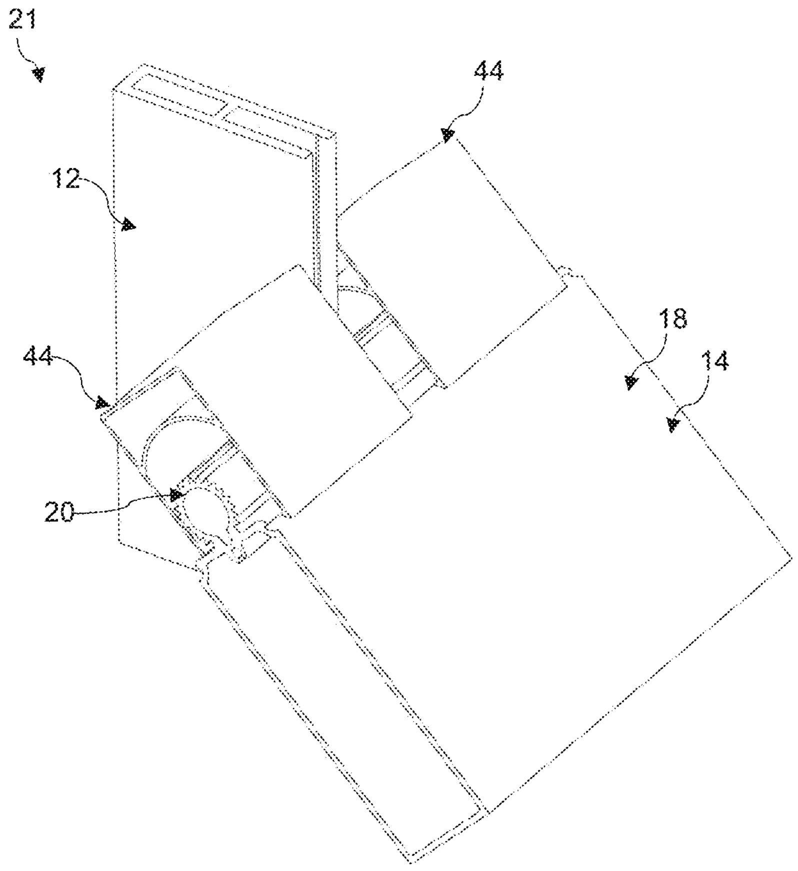
FIG. 5 shows a perspective view of the building wall assembly of FIG. 1 installed in a second condition.
Figure 6:
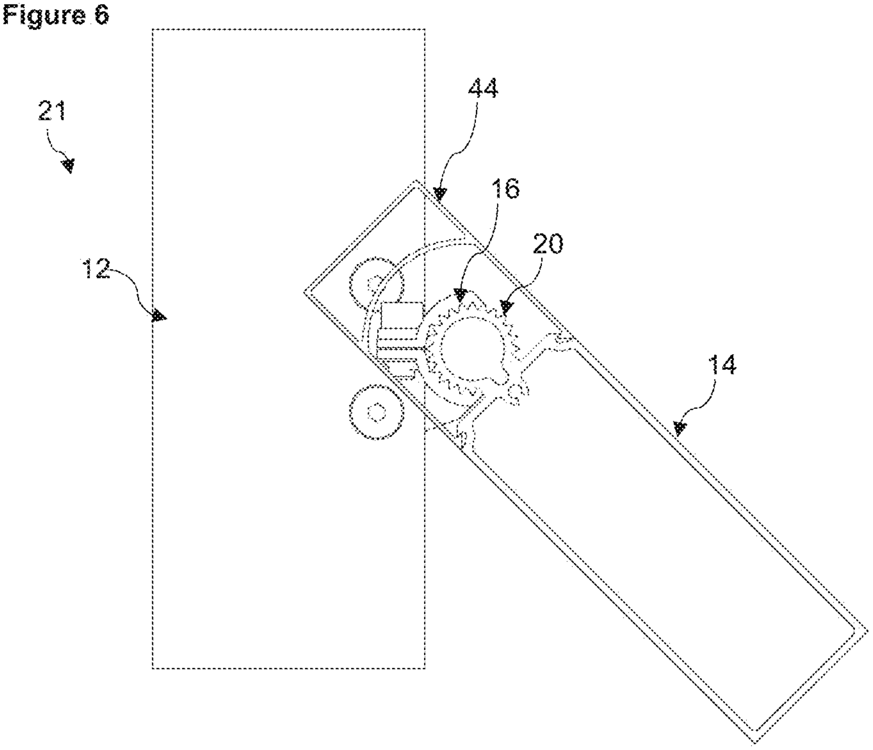
FIG. 6 shows a side view of the building wall assembly of FIG. 5.
Figure 7:
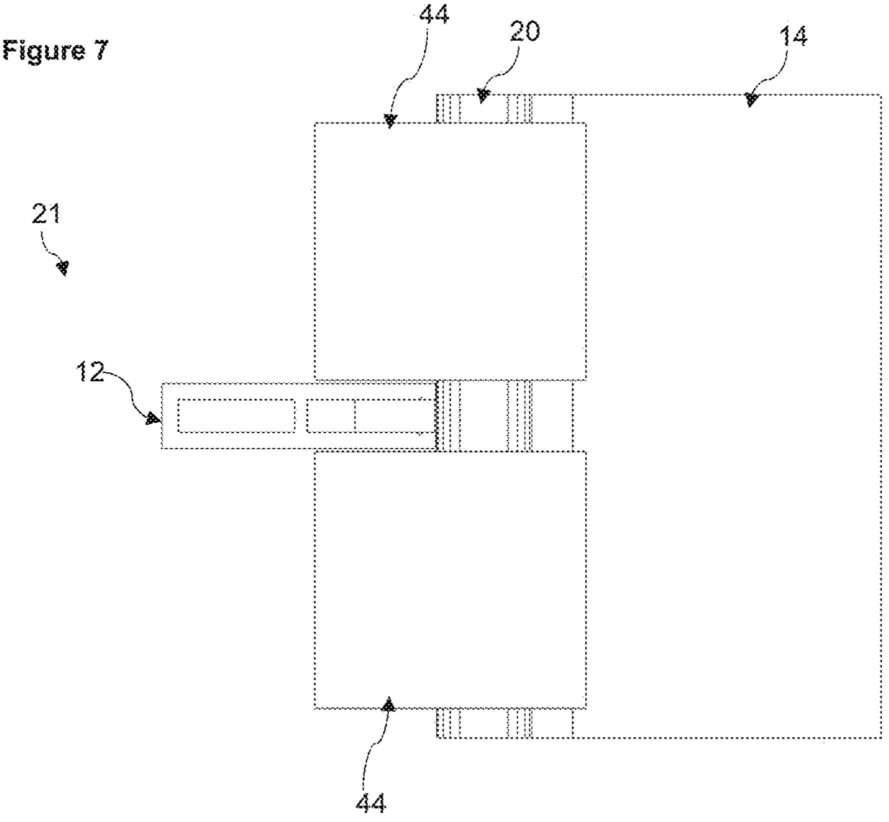
FIG. 7 shows a top view of the building wall assembly of FIG. 5.

Referring to FIGS. 5 to 7, the building louvre assembly 10 is shown attached to the mullion 12 in a second condition. The second condition is where the louvre 14 extends at a non-perpendicular and non-parallel angle to the mullion 12. For example, here the louvre 14 extends at an angle of 45 degrees or substantially 45 degrees in a downward direction.

This is achieved in a similar or identical way as for the first condition, except that the mounting element 20 of the louvre 14 is positioned at said angle when the mounting element 20 is positioned relative to the receiver 28. The teeth 34 of the receiver 28 are meshable with the teeth 24 of the mounting element 20 when the louvre 14 is positioned at 45 degrees or substantially 45 degrees relative to the clamp 16. The teeth 34 of the receiver 28 are similarly meshable with the teeth 24 of the mounting element 20 when the louvre 14 is positioned at a plurality of different incremental angles. For example, there may be at least three different angular positions.

It is therefore possible to mount a louvre at a plurality of different incremental angles relative to a building wall.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A building louvre assembly comprising:

a louvre having an elongate louvre body and an elongate mounting element, a longitudinal extent of the elongate mounting element at least in part extending alongside at least a portion of a longitudinal extent of the louvre body, the elongate mounting element including teeth;

a clamp for being supported by at least any one of a building wall and a building façade, the clamp having a receiver configured to support the louvre by clamping on at least a portion of the elongate mounting element, the receiver having teeth configured to mesh with the teeth of the elongate mounting element so that the louvre can be supported at angular increments relative to the clamp; and two covers which are separate parts to the louvre and which are configured to be attached to the louvre either side of the clamp, the covers being configured to conceal at least part of the elongate mounting element.

2. The building louvre assembly as claimed in claim 1, wherein said covers are configured to be attached to the louvre via an interference fit.

3. The building louvre assembly as claimed in claim 2, wherein the interference fit comprises at least one of the covers and the louvre having a barb.

4. The building louvre assembly as claimed in claim 3, each of the covers having a barb configured to be secured by a corresponding lip of the louvre body.

5. The building louvre assembly as claimed in claim 1, wherein the clamp has a plurality of parts, the parts being securable relative to each other to provide the clamping on at least the portion of the elongate mounting element.

6. The building louvre assembly as claimed in claim 1, wherein the receiver of the clamp has three open sides.

7. The building louvre assembly as claimed in claim 1, wherein the elongate mounting element has a circular cross-sectional profile.

8. The building louvre assembly as claimed in claim 1, wherein the teeth extend around at least a majority of a perimeter of a cross section of the elongate mounting element.

9. The building louvre assembly as claimed in claim 1, wherein the longitudinal extent of the elongate mounting element extends alongside at least a majority of the longitudinal extent of the louvre body.

10. The building louvre assembly as claimed in claim 9, wherein the longitudinal extent of the elongate mounting element extends alongside all of the longitudinal extent of the louvre body.

11. The building louvre assembly as claimed in claim 1, wherein the teeth of the mounting element extend along all of the longitudinal extent of the mounting element.

12. The building louvre assembly as claimed in claim 1, further comprising a fastener for fastening the clamp to said at least any one of the building wall and the building façade.

13. A method of setting an angle of a louvre relative to at least any one of a building wall and a building façade, the method comprising:

a) providing the building louvre assembly as claimed in claim 1;

b) supporting the clamp from said any one of the building wall and the building façade;

c) positioning the mounting element in the receiver so that the teeth of the building element and the teeth of the receiver mesh and the louvre is at a pre-determined angle relative to the clamp; and d) clamping the receiver on the mounting element so as to secure the louvre in position.

14. A building wall assembly comprising the building louvre assembly as claimed in claim 1 and at least any one of a mullion and a transom, the clamp supportable by said at least any one of the mullion and the transom.

15. A building wall comprising the building wall assembly as claimed in claim 14.

16. A building louvre assembly as claimed in claim 1, wherein the clamp comprises two clamp parts defining the receiver, each of the clamp parts forming half of a C shape.

* * * * *